United States Patent
Backman et al.

(10) Patent No.: US 7,747,763 B2
(45) Date of Patent: Jun. 29, 2010

(54) SYSTEM AND METHOD FOR ENSURING A DEVICE USES THE CORRECT INSTANCE OF A NETWORK SERVICE

(75) Inventors: Drake Backman, Orem, UT (US); Matthew E. Lewis, Mapleton, UT (US)

(73) Assignee: Novell, Inc., Provo, UT (US)

( * ) Notice: Subject to any disclaimer, the term of this patent is extended or adjusted under 35 U.S.C. 154(b) by 1370 days.

(21) Appl. No.: 11/189,043

(22) Filed: Jul. 26, 2005

(65) Prior Publication Data
US 2007/0027970 A1    Feb. 1, 2007

(51) Int. Cl.
   *G06F 15/16*      (2006.01)
   *G06F 15/173*      (2006.01)
(52) U.S. Cl. .................. 709/229; 709/225; 709/235
(58) Field of Classification Search ............. 709/229, 709/233, 225
   See application file for complete search history.

(56) References Cited

U.S. PATENT DOCUMENTS

| | | | |
|---|---|---|---|
| 6,182,136 B1 * | 1/2001 | Ramanathan et al. | 709/224 |
| 6,338,112 B1 | 1/2002 | Wipfel et al. | 710/269 |
| 6,742,035 B1 | 5/2004 | Zayas et al. | 709/226 |
| 6,760,775 B1 * | 7/2004 | Anerousis et al. | 709/238 |
| 6,766,348 B1 | 7/2004 | Combs et al. | 709/104 |
| 6,856,991 B1 * | 2/2005 | Srivastava | 707/10 |
| 6,862,594 B1 | 3/2005 | Saulpaugh et al. | 707/10 |
| 6,898,701 B2 | 5/2005 | French et al. | 713/2 |
| 2001/0049717 A1 * | 12/2001 | Freeman et al. | 709/203 |
| 2004/0064558 A1 * | 4/2004 | Miyake | 709/226 |
| 2005/0027862 A1 * | 2/2005 | Nguyen et al. | 709/225 |

OTHER PUBLICATIONS

P. Mockapetris; "Domain Names—Concepts and Facilities"; Nov. 1987; The Internet Engineering Task Force, Network Working Group, RFC 1034.*

Mockapetris Isi P., "Domain Names—Concepts and Facilities; rfc1034.txt", IETF Standard, Internet Engineering Task Force, IETF, CH, Nov. 1987, XP015005973, 56 pages.

* cited by examiner

*Primary Examiner*—Moustafa M Meky
*Assistant Examiner*—Blake Rubin
(74) *Attorney, Agent, or Firm*—Pillsbury Winthrop Shaw Pittman LLP

(57) ABSTRACT

A system and method are provided for ensuring access to the correct instance of a network service. The system includes a plurality of management domains. Each management domain may include at least one server and at least on managed device. When the managed device sends a request for a network service, the request may be received by all servers in the network, including those belonging to different management domains. As such, each server may include a referral list. When the server receives a request, the server may determine whether its management domain includes the appropriate instance of the network service. If it does not, it may forward the request to other servers in the referral list until the appropriate network service is identified.

15 Claims, 5 Drawing Sheets

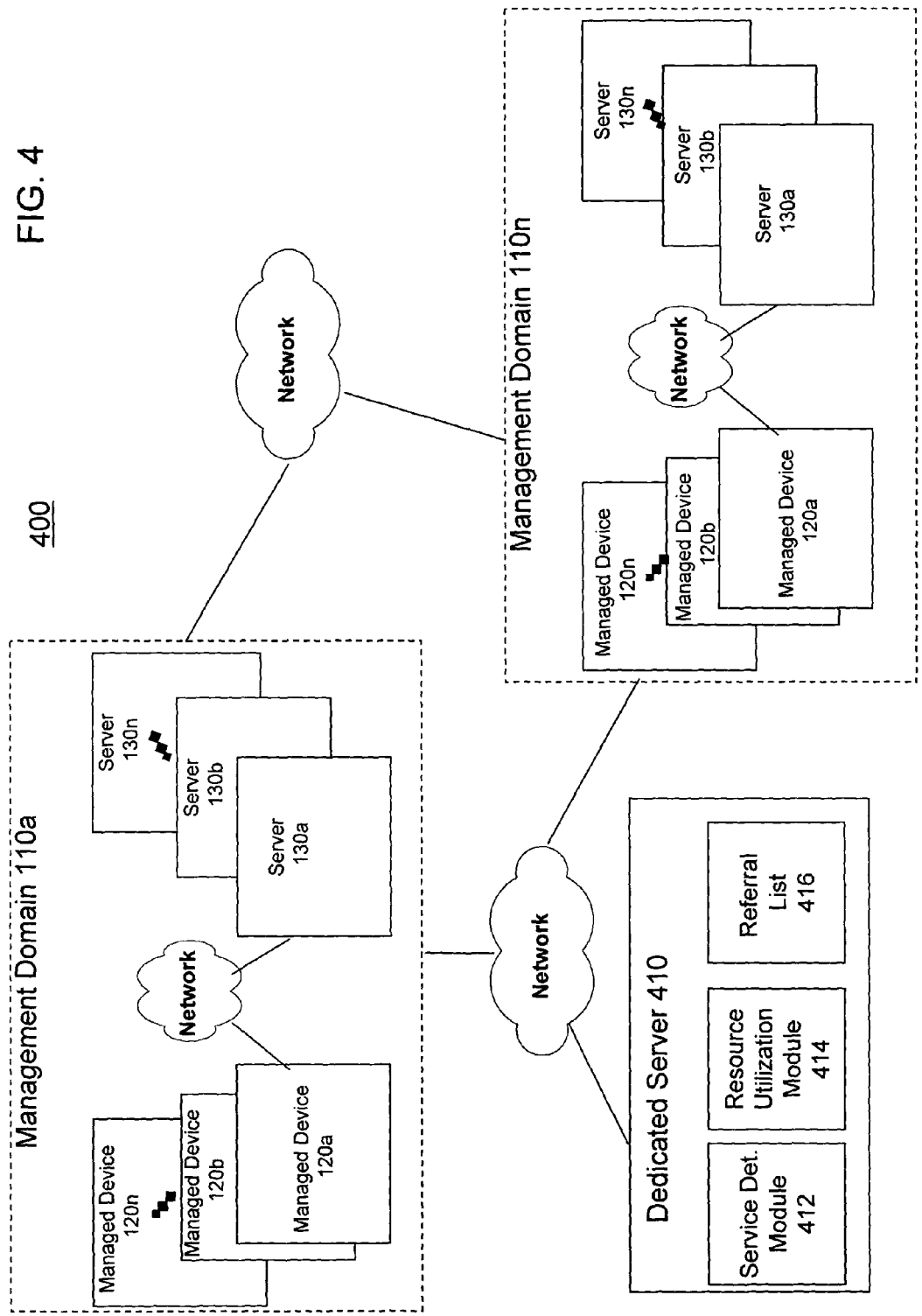

SYSTEM AND METHOD FOR ENSURING A DEVICE USES THE CORRECT INSTANCE OF A NETWORK SERVICE

FIELD OF THE INVENTION

The invention relates to a system and method for ensuring the correct instance of a network service is used where multiple instances exist in a service broadcast environment.

BACKGROUND OF THE INVENTION

Many corporate information technology (IT) departments use resource management products to ease the cost and burden of managing large numbers of computing devices. Within these resource management products, managed devices are usually assigned a unique identity.

Some work may be performed by the managed devices in conjunction with a network service. In some instances, the device may be told the location of the required service. In other instances, the device must discover the network service.

Some network resources may only be discovered through a response to a broadcast request. When only one resource management product exists on the network, and it has only a single management domain, the managed device is free to discover and use any instance of the required network service.

Problems often arise when there are multiple management domains within a network. For example, the managed device can not be guaranteed that the instance of the network service responding to its broadcast request is the correct instance of the service. If the managed device chooses the incorrect instance of the network service, the results may be unpredictable. The odds of selecting the correct instance of the network service diminish as the number of management domains rise.

Other problems and drawbacks exist in current resource management environments.

SUMMARY OF THE INVENTION

A system and method for ensuring the correct instance of a network service is used where multiple instances exist is provided. The system may include a plurality of management domains. Each management domain may include at least one managed device and at least one server.

The managed device may include a service determination module and a resource utilization module. The service determination module may be configured to locate the network service by generating a network service request query. The resource utilization module may be configured to receive and implement the requested network service Each server may include instances of a plurality of network services. As such, each server may include a network services management module configured to determine whether it includes the instance of the network service required by the requesting device. Each server may further comprise a referral list which provides information about the other servers in the network. The referral list may be used to forward network service request received by a server that does not include the correct instance of the network service.

A managed device may issue a request for a network service. The request may be a broadcast request and may be received by all servers within the network, including those servers belonging to a different management domain.

When a server receives the request, the server may determine whether the request includes identity information. If the request does not include identity information, a general response may be provided to the requesting device requiring additional information.

If identity information is included, the server may determine whether its management domain is identified. If its management domain is identified, the server may provide the network service to the requesting device. If the receiving server's management domain is not identified, the request may be forwarded to one or more other servers identified in the referral list.

Once the appropriate server and network service instance has been identified, the receiving server may forward a response to the requesting device. The response may provide the requesting device with information identifying its appropriate server, and instructions to contact the appropriate server with future requests.

According to some embodiments of the invention, a dedicated server may be used to respond to all requests for network services. In other embodiments, all servers in the network may receive and respond to broadcast requests for network services.

BRIEF DESCRIPTION OF THE DRAWINGS

FIG. 4 depicts a system for ensuring access to the correct network service, in accordance with various embodiments of the invention.

DETAILED DESCRIPTION OF PREFERRED EMBODIMENTS

In accordance with various disclosed embodiments, a system and method are provided for ensuring that the correct instance of a network service is selected and used where multiple instances exist. As described above, multiple management domains often exist within a network. As such, a managed device may not receive a response from the appropriate instance of a network service when issuing a broadcast request. However, by making each instance of a network service aware of all other instances, the invention seeks to ensure that a managed device is referred to the appropriate instance of the network service.

Figure 1A:
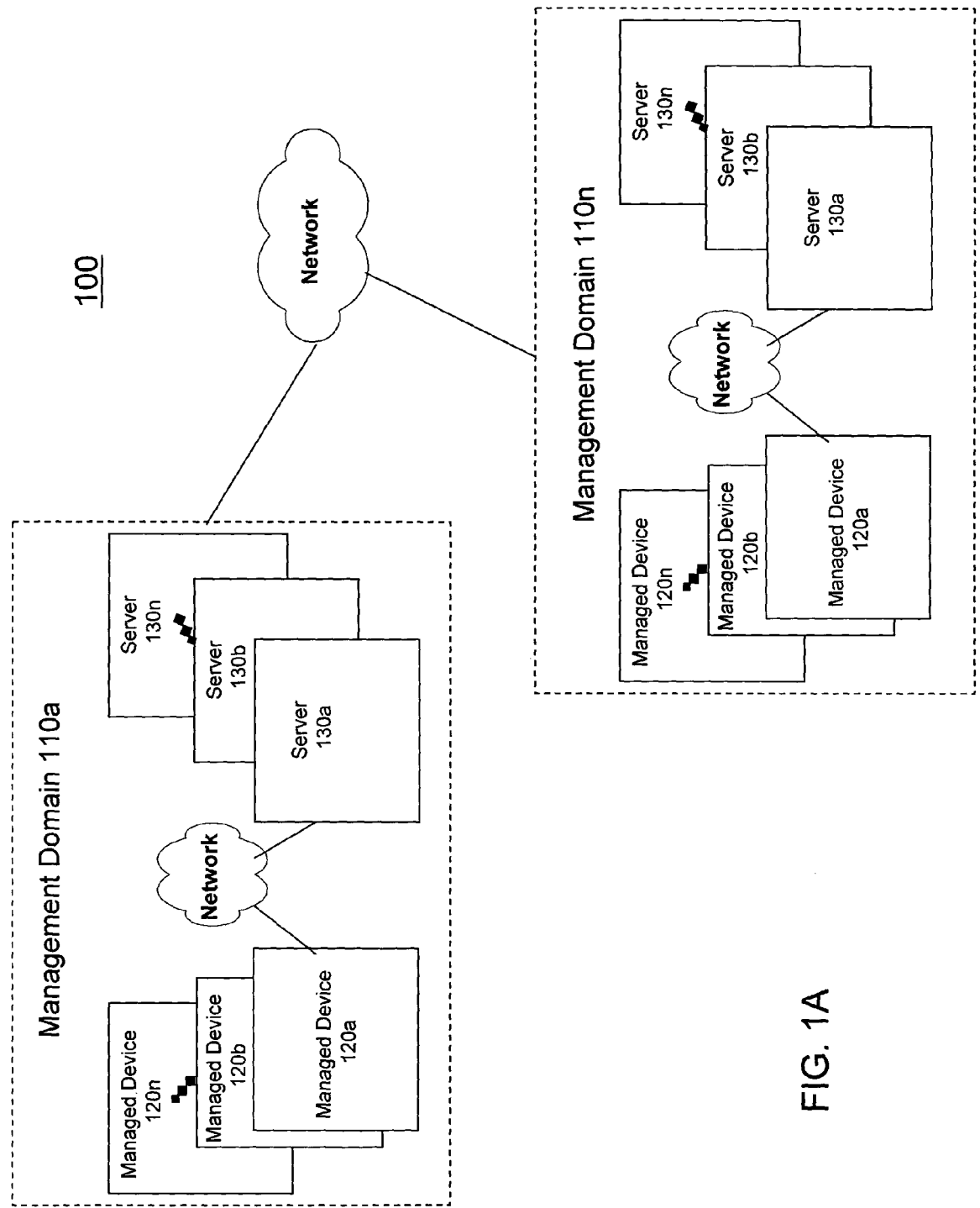
FIG. 1A depicts a system for ensuring access to the correct network service, in accordance with various embodiments of the invention.

Consistent with these embodiments, FIG. 1A depicts system 100 comprising a plurality of management domains 110a-n. Each management domain 110n may include one or more managed devices 120a-n communicatively coupled to one or more servers 130a-n. Management domains 110n may be a part of the same network. As such, management domains 110n may be communicatively coupled to each other over a network, as shown.

Managed device 120n may be any computer device capable of communications over a network. For example, managed device 120n may be a laptop computer, desktop computer, handheld electronic device, or any other network enabled computer device. Managed device 120n may be configured to issue requests for network services. Network services may include, for example, network boot options, addressing information, and/or other network services. Server 130n may be configured to receive the network service request from managed network device 120n and to provide network service information to managed device 120n.

Managed device 120n may be assigned a unique identity, such as a unique name or number. Work to be performed by managed device 120n may be assigned and administered by server 130n in conjunction with a network service.

Figure 1B:
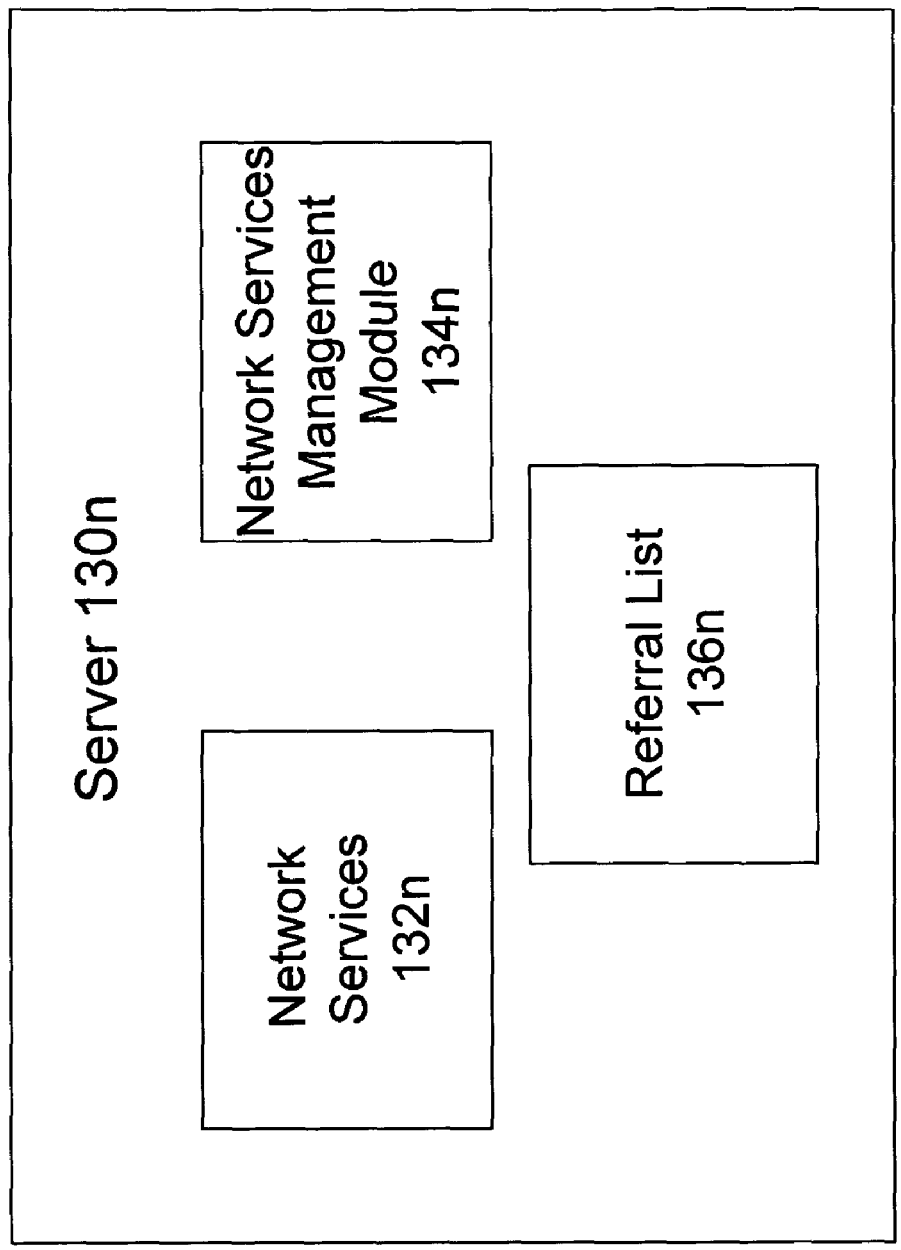
FIG. 1B depicts a server for providing the correct instance of a network service, in accordance with various embodiments of the invention.

Each server 130n may include an instance of one or more network services 132n, as depicted in FIG. 1B. Accordingly, each server 130n may be equipped with a network services management module 134n. Network services management module 134n may be configured to determine whether the server receiving a network service request includes the correct instance of the network service needed by the requesting device. Each server 130n may be aware of the existence of other services. As such, server 130n may maintain a referral list 136n providing information about the other servers in the network In some embodiments of the invention, managed device 120n may be directly informed of the required network service. In other embodiments of the invention, managed device 120n must discover the network service. Some network services may be discovered by issuing a broadcast request.

Figure 2:
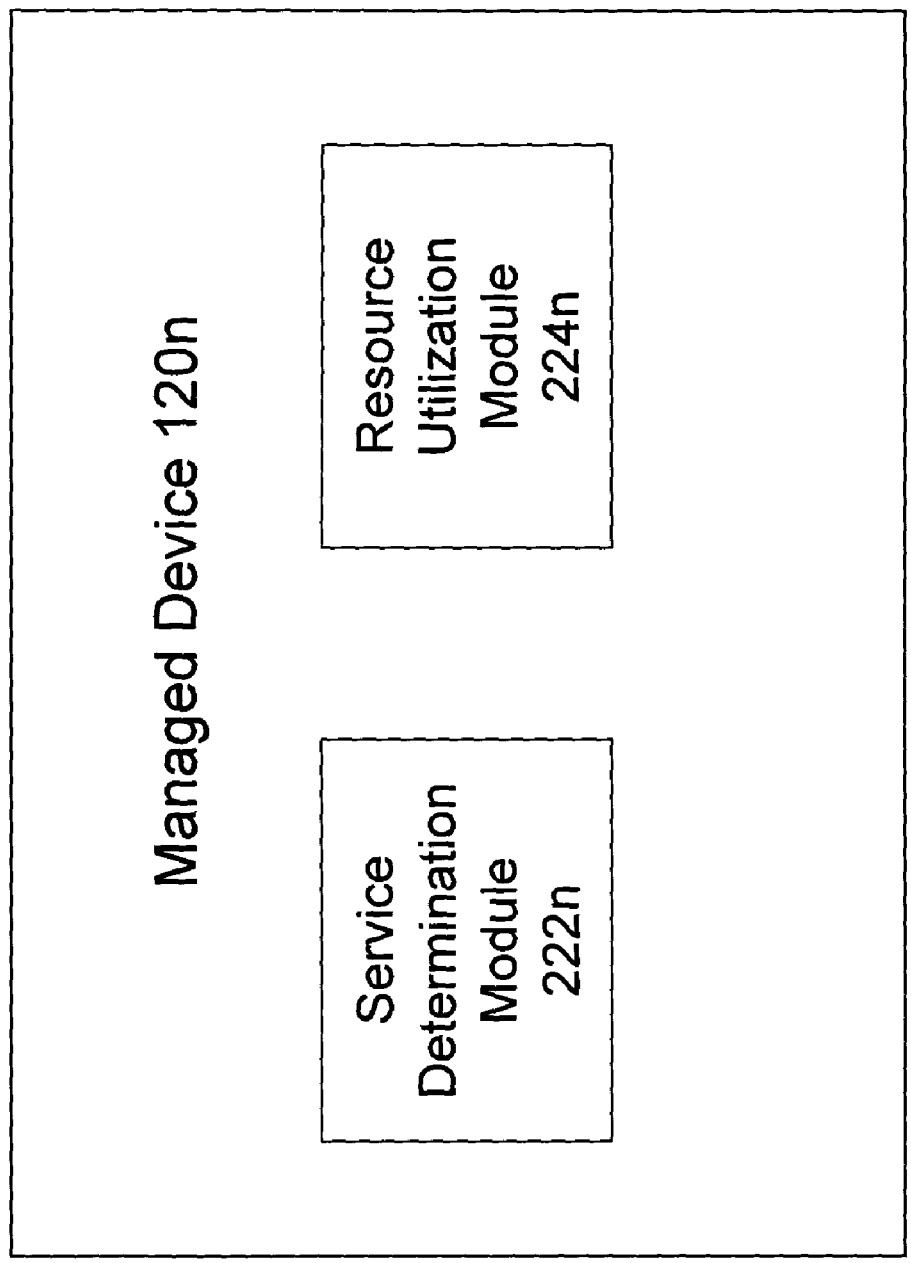
FIG. 2 depicts a managed device for requesting a network service, in accordance with various embodiments of the invention.

Accordingly, managed device 120n may include one or more modules for facilitating the request for, and receipt of, service information. As depicted in FIG. 2, managed device 120n may include a service determination module 222 and a resource module 224. According to some embodiments of the invention, service determination module 222 and resource utilization module 224 may be implemented as software modules.

Service determination module 222 may be configured to locate a desired network service by generating a service request query. The query may include identity information according to some embodiments of the invention. In other embodiments, no identity information is included. The service request query may be issued automatically upon startup of the managed device. Resource utilization module 224 may be configured to receive responses from the broadcast request and to access the determined network service.

Figure 3:
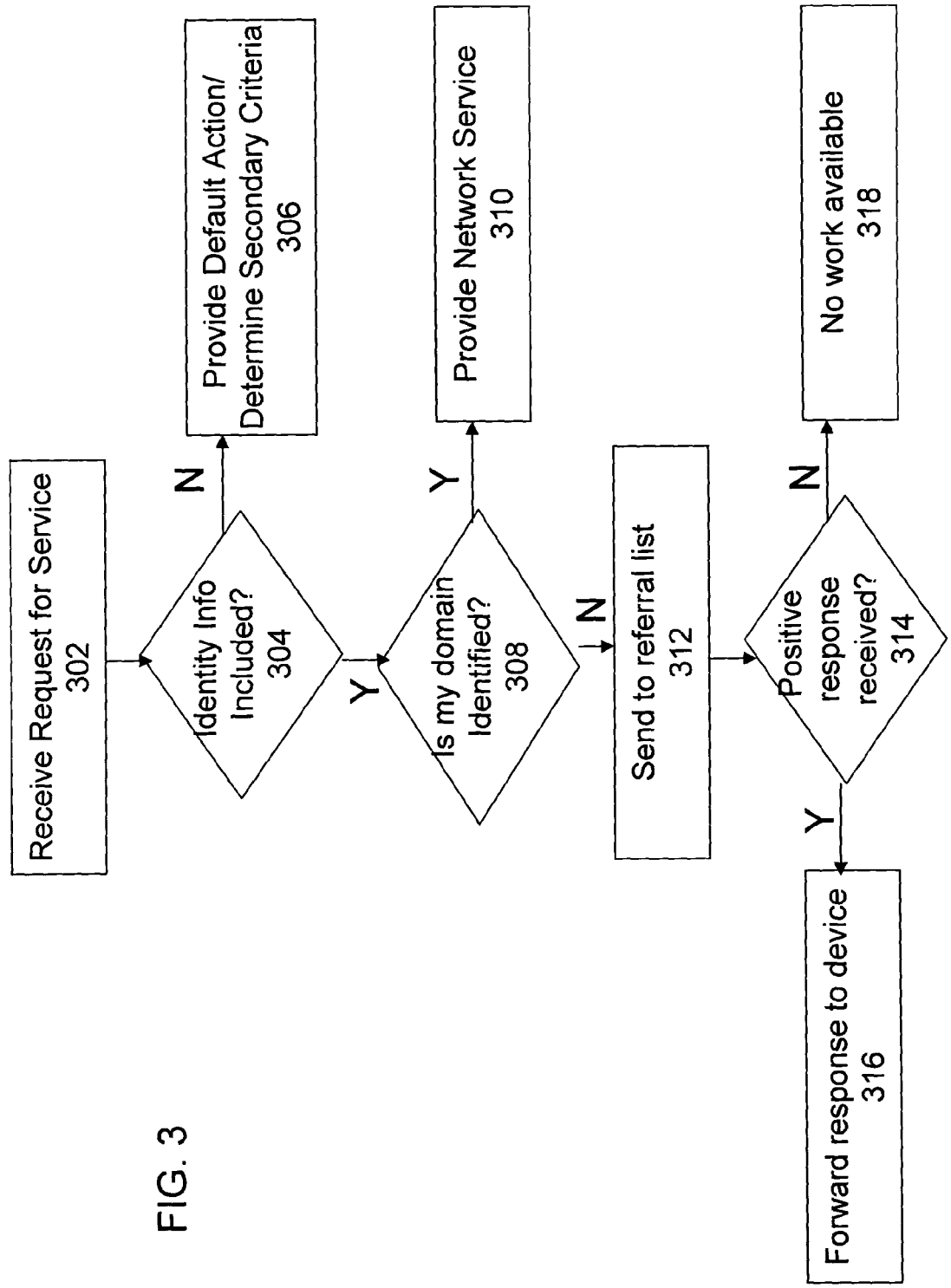
FIG. 3 depicts a process for providing access to a network service, in accordance with various embodiments of the invention.

Referring now to FIG. 3, a process 300 is illustrated for providing managed device 120n with the appropriate instance of a network service. As depicted at 302, a request for a network service may be received. The request may be a broadcast request from managed network device 120n. As such, the broadcast request may be received by a plurality of servers located in a plurality of management domains within the network. Each server may include an instance of the desired network service and may maintain a list of information about other instances, which may be associated with other management domains.

As described above, each management domain 110A-110N may include an instance of a network service responsible for communicating with its managed device. However, broadcast messages sent from one of the managed devices will be received by not only the servers within the same management domain, but also those servers in other management domains. As such, each server should be able to determine whether it is the appropriate server to provide the requested network service.

As depicted at 304, a receiving server may determine whether or not the received request includes identity information. Identity information may include, for example, a name or other unique identifying attribute associated with the managed device, indicia indicating membership in a particular management domain, and/or other identity information.

If the request does not include identity information and the receiving server is unable to otherwise determine whether the request refers to its management domain, a default action, as depicted at 306. According to some embodiments of the invention, the default action may be a request to obtain additional information, as depicted at 306. In other embodiments, the correct service instance may be determined by secondary criteria, such as a network address, amount of memory, and/or other parameters that may be detected at runtime.

If the request includes identity information, the receiving server is able to determine whether it should provide the requested network service, as depicted at 308. Each management domain may include one or more servers. Any server within the management domain may respond to a requesting device with the correct instance of a network service. As such, the receiving server may refer to the identity information provided in the request to determine whether its management domain is identified.

If identity information exists in the request and it refers to the management domain of the receiving server, the server may respond to the broadcast request by providing the requested network service, as depicted at 310. However, if the identity information does not refer to the management domain of the receiving server, the receiving server may forward the request to other servers in its referral list, as depicted at 312.

As noted above, each server 130n may include a referral list. The referral list provides information about other servers in the network which may be located in other management domains. According to some embodiments of the invention, identity information may include the name of the management domain to which the requesting device belongs. As such, the request may be forwarded directly to the identified management domain. In other embodiments, the identify information does not identify a specific management domain. According to those embodiments of the invention, a receiving server forwards the request to each server listed in its referral list until the appropriate server is identified, as depicted at 314.

If none of the servers in the list respond favorably to the request by indicating that the requesting device belongs to their management domain, the server forwarding the request may then respond to the requesting device that no work is available, as depicted at 318. If, however, a favorable response is received, the response may be forwarded to the requesting device, as depicted at 316. According to some embodiments of the invention, instructions to the requesting device to contact the appropriate server for future requests may be forwarded to the requesting device. In other embodiments, the receiving server may act as a proxy, facilitating the exchange of network service information between the managed device and the server.

As described above, a management domain may contain multiple servers which may be used to provide the appropriate instance of a network service to a requesting managed device. As such, load balancing may be used to share the responsibility of responding to requests. For example, a server within a management domain may be designated the primary server and may be responsible for receiving network service requests. Once the primary server has determined that its management domain should respond to the network service request, the primary server can then determine which other server on its management domain has the lightest load. The primary server may then forward the request to the server having the lightest load.

According to some embodiments of the invention, multiple servers within a management zone may be arranged in as a server cluster. Server clustering allows multiple servers to act in concert, appearing as a single virtual server to other network devices. If any of the servers in the cluster fail for any reason, the other servers in the cluster may take over. A cluster-enabled service may be run over the virtual server, enabling the service to remain in operation in the event one of the physical servers in the cluster fails.

According to some embodiments of the invention, a dedicated server may be provided for responding to network service requests. FIG. 4 depicts a system 400 in accordance with these embodiments. Management domains 110a-n are described above in reference to FIG. 1. Dedicated server 410 may include a referral list 416 that includes information about the servers in management domains 110a-n. Rather than transmitting a broadcast request to discover a network service, managed device 120n may send a request directly to dedicated server 410.

Dedicated server 410 may include a dedicated service determination module 412 and a dedicated resource utilization module 414. Service determination module 412 may be configured to locate a desired network service in response to the receipt of a request from managed device 120n. As described above, a network service request form managed device 120n may or may not include identity information. If identity information is provided, service determination module 412 may forward the request directly to the identified server. If identity information is not included, service determination module 412 may forward the request to each server in its referral list until a response is received indicating the appropriate network service.

Resource utilization module 414 may be configured to receive response from servers in the referral list and to enable communication between the requesting managed device 120n and the appropriate server 130n. According to some embodiments of the invention, resource utilization module 414 may refer the requesting managed device 120n to the appropriate server. In other embodiments, the dedicated server 410 may act as a proxy and resource utilization module 414 may facilitate the exchange of network service information between managed device 120n and server 130n.

Other embodiments, uses, and advantages of the invention will be apparent to those skilled in the art from consideration of the specification and practice of the invention disclosed herein. This specification should be considered exemplary only, and the scope of the invention is accordingly intended to be limited only by the following claims.

What is claimed is:

1. A system for providing a device access to a correct instance of a network service, comprising:
   a plurality of managed devices configured to issue a request for the network service; and
   a plurality of management domains communicatively coupled to each other via a network, each of the plurality of managed devices belonging to at least one of the plurality of management domains, wherein each of the plurality of management domains comprises:
      at least one server comprising an instance of the network service, wherein the instance of the network service is responsible for communicating with one or more of the plurality of managed devices that belong to the management domain of the at least one server; and
      a network service management module configured to:
         receive a request for the network service from at least one of the plurality of managed devices;
         provide the at least one requesting device access to the instance of the network service if the request refers to the management domain of the at least one server;
         forward the request to one or more other servers in the network if the request does not refer to the management domain of the at least one server; and
         receive a response to the forwarded request from one of the other servers in the network, wherein the response indicates that the requesting device has membership in the management domain of the responding server, wherein the at least one server acts as a proxy facilitating an exchange of information relating to the network service between the requesting device and the responding server.

2. The system of claim 1, wherein the at least one server further comprises a referral list that provides information about the other servers in the network, wherein one or more of the other servers in the referral list are located in other management domains.

3. The system of claim 1, wherein each of the plurality of managed devices comprises:
   a service determination module configured to generate the request for the network service; and
   a resource utilization module configured to receive a response to the request, wherein the response includes instructions for accessing the network service.

4. The system of claim 1, wherein the request for the network service includes a broadcast request transmitted to each of the plurality of management domains, wherein the requesting device has membership in a particular one of the plurality of management domains.

5. The system of claim 4, wherein the request for the network service includes identity information for the requesting device, the identity information comprising at least one of a unique attribute associated with the requesting device, indicia indicating membership in the particular one of the plurality of management domains, a network address, an amount of memory, or parameters that can be detected at runtime.

6. The system of claim 1, wherein the network service management module is further configured to:
   forward the response to the requesting device, wherein the forwarded response instructs the requesting device to contact the responding server for future requests for the network service.

7. The system of claim 6, wherein at least one of the plurality of management domains comprises a primary server and one or more secondary servers, wherein the primary server is configured to:
   receive the request for the network service;
   determine which of the secondary servers has a lightest load when the request refers to the management domain of the primary server; and
   forward the request to the secondary server having the lightest load.

8. The system of claim 1, wherein at least one of the plurality of management domains comprises a plurality of servers arranged as a server cluster, wherein the plurality of servers in the server cluster appear as a single virtual server to other devices in the network.

9. A method for providing a device access to a correct instance of a network service, comprising:
   receiving, at a server located in at least one of a plurality of management domains communicatively coupled to each other via a network, a request for a network service from at least one of a plurality of managed devices, each of the plurality of managed devices having membership in a particular one of the plurality of managements domains communicatively coupled to one another via the network, wherein the receiving server comprises an instance of the network service requested by the at least one managed device, wherein the instance of the network service is responsible for communicating with the managed devices within the management domain of the receiving server;

providing, by the receiving server, the at least one requesting device access to the instance of the network service if the request refers to the management domain of the receiving server;

forwarding, by the receiving server, the request to one or more other servers in the network if the request does not refer to the at least one management domain of the receiving server; and receiving a response to the forwarded request from one of the other servers in the network, wherein the response indicates that the requesting device has membership in the management domain of the responding server, wherein the receiving server acts as a proxy facilitating an exchange of information relating to the network service between the requesting device and the responding server.

10. The method of claim 9, further comprising determining whether the request refers to the management domain of the receiving server based on identity information in the request.

11. The method of claim 10, further comprising requesting the identity information when the request does not include the identity information.

12. The method of claim 10, wherein the identity information for the requesting device includes at least one of a unique attribute associated with the requesting device, indicia indicating membership in the particular one of the plurality of management domains, a network address, an amount of memory, or parameters that can be detected at runtime.

13. The method of claim 9, wherein forwarding the request to the other servers in the network includes using a referral list that provides information about the other servers in the network, wherein one or more of the servers in the referral list are located in other management domains.

14. The method of claim 9, further comprising:
forwarding the response to the requesting device, wherein the forwarded response includes instructions for the requesting device to contact the responding server for future requests for the network service.

15. The method of claim 14, wherein the requesting device uses the instructions in the response to access the network service from the responding server.

* * * * *